Patented Sept. 4, 1934

1,972,259

UNITED STATES PATENT OFFICE 1,972,259

METHOD OF PREPARATION OF MIXED GASES AND OF COMBUSTION THEREOF

Herman A. Brassert, Chicago, Ill., assignor to H. A. Brassert & Company, Chicago, Ill., a corporation of Illinois No Drawing. Application December 26, 1930, Serial No. 505,001

5 Claims. (Cl. 158—117.5)

This invention relates to the combustion of natural gas in metallurgical or other high temperature industrial furnaces, and particularly in open hearth furnaces for the production of steel.

The combustion of natural gas on account of its very high B. t. u. content, which requires for proper combustion from eight to twelve times its volume of air, is, on account of the discrepancy in respective volumes, difficult to regulate so as to obtain efficient results. It burns with a flame of low luminosity and consequently transfers but little heat by radiation and must depend on convection. It also has the disadvantage that it makes a very sharp flame, which is destructive to refractory materials. Furthermore, its low specific gravity gives the flame a tendency to whip upward, which is destructive to the roof of such furnaces. Also operators of open hearth and other metallurgical furnaces find it difficult to control a natural gas flame on account of its low luminosity, particularly in case most of the luminants have been extracted with the gasoline, which is often done before distributing the gas for industrial uses.

It is an object of the present invention to provide a new and improved method for the combustion of natural gas in metallurgical furnaces.

It is a further object to provide a new and improved method of operation of open hearth furnaces or the like with natural gas as a component of the fuel.

It is an additional object to provide a method whereby the constituents of natural gas may be partially broken down for more effective combustion in metallurgical furnaces.

It is also an object to provide a method whereby inert gases containing carbon monoxide may be enriched by combination with natural gas.

Other and further objects will appear as the description proceeds.

My invention consists in mixing the natural gas with gases of a low B. t. u. value and containing $CO_2$, such as blast furnace or producer gas, or waste gases such as chimney gases from metallurgical or boiler furnaces, and regenerating the mixture of these gases. Up to the present time, natural gas has not been regenerated, such procedure without admixture of lean or inert gases being impractical owing to the high effective heat which would be created by regenerating so rich a gas, which heat would destroy any of the refractory materials used in the construction of such furnaces. Furthermore, the volume of the natural gas passing through the gas regenerator would be so low that there would be danger of the carbon depositing in the checkerwork. However, by mixing the natural gas with lean waste gases, its regeneration becomes practical from the standpoint of the heat limits permissible in such furnaces, and also the volume becomes great enough so that velocities through the checkerwork will be sufficient to prevent clogging with carbon.

Important advantages result from the regeneration of the mixture of natural gas with inert, lean gases containing $CO_2$. By regenerating the natural gas, most of its hydro-carbon compounds are broken up into their component parts, namely, carbon, hydrogen and some lighter hydrocarbons. The molecular carbon so formed becomes highly luminous in its combustion and gives the flame that luminosity which is so desirable for increased heat transfer by radiation and for easy control of the furnace operation. The $CO_2$ content of the lean or inert gases which have been mixed with the natural gas is in the presence of molecular carbon and in a temperature about 1000° C. changed to CO in accordance with the reaction.

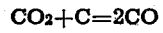

$$CO_2 + C = 2CO$$

The lean and inert component of the gas mixture is thereby enriched, the inert gas becoming a combustible gas and the lean gas acquiring a higher B. t. u. content. The resulting gas is heavier than the natural gas and results in the flame lying close to the bath, which is a matter of greatest importance in open hearth and heating furnace operation, because it increases the heat transfer by convection and radiation. Furthermore, by adjusting the mixture of these gases, the B. t. u. content can be regulated in accordance with the demands of any particular period of operation of the furnace. For instance, in case of the open hearth furnace, during the first or melting down period of the cold charge, a higher B. t. u. gas mixture can be used, whereas during the finishing period the use of a very lean gas is made possible, for instance of a gas containing only a third or even less B. t. u. per volume unit than the gas used during the melting down period. The use of a lean gas for finishing a heat gives the most favorable conditions for refining the steel. In an open hearth or other furnace the stack of such furnace may be the source of inert gases for mixture with the natural gas, and some of the heat from the stack gases may be thus returned to the furnace.

The specific examples of my invention are to be understood as illustrative only as I contemplate such changes and modifications as come within the spirit and scope of the appended claims.

I claim:

1. The method of preparation of a mixed gas which comprises mixing natural gas and a gas rich in carbon dioxide, and heating such mixture at temperatures such that carbon deposited from the natural gas combines with carbon dioxide to form carbon monoxide.

2. The method of preparation of a mixed gas which comprises mixing natural gas and a gas rich in carbon dioxide, heating such mixture at temperatures such that carbon deposited from the natural gas combines with carbon dioxide to form carbon monoxide, and maintaining a velocity during heating such that substantially all of any uncombined carbon is carried along with the gases.

3. The method of preparation of a mixed gas from gases high in carbon dioxide, which comprises mixing them with natural gas, and bringing the mixture to a temperature such that carbon from the components of the natural gas is combined with carbon dioxide from the waste gases to form carbon monoxide.

4. The process of combustion of gaseous fuel, which comprises mixing natural gas used as a primary fuel with gases having a higher carbon dioxide content, heating the mixture to a temperature that causes separation of carbon from the natural gas and combination of the carbon with the carbon dioxide to form carbon monoxide, delivering the heated mixture to a furnace, supplying air for combustion to said mixture in the furnace, and burning said mixture.

5. The process of combustion of gaseous fuel, which comprises mixing natural gas used as a primary fuel with gases having a high carbon dioxide content, heating the mixture to a temperature that causes separation of carbon from the natural gas and combination of the carbon with the carbon dioxide to form carbon monoxide, delivering the heated mixture to a furnace, supplying air for combustion to said mixture in the furnace, burning said mixture, and maintaining the temperature and velocity during the heating process such that a material portion of any carbon deposited from the natural gas combines with the carbon monoxide, and uncombined carbon is carried along with the gases to the furnace.

HERMAN A. BRASSERT.